United States Patent
Mauney et al.

(10) Patent No.: US 11,308,463 B2
(45) Date of Patent: Apr. 19, 2022

(54) SECURE TRANSMISSION-PAIRING DATABASE SYSTEM

(71) Applicant: Branch Banking and Trust Company, Winston-Salem, NC (US)

(72) Inventors: Dan Mauney, Cary, NC (US); Lee Ratcliffe, Jr., Garner, NC (US); Matthew Whitley, Cary, NC (US)

(73) Assignee: Truist Bank, Charlotte, NC (US)

( * ) Notice: Subject to any disclaimer, the term of this patent is extended or adjusted under 35 U.S.C. 154(b) by 1274 days.

(21) Appl. No.: 15/154,230

(22) Filed: May 13, 2016

(65) Prior Publication Data

US 2016/0335638 A1 Nov. 17, 2016

Related U.S. Application Data

(60) Provisional application No. 62/160,941, filed on May 13, 2015.

(51) Int. Cl.
*G06Q 20/10* (2012.01)
*G06Q 20/22* (2012.01)

(52) U.S. Cl.
CPC .......... *G06Q 20/10* (2013.01); *G06Q 20/102* (2013.01); *G06Q 20/108* (2013.01); *G06Q 20/227* (2013.01)

(58) Field of Classification Search
CPC ..... G06Q 20/10; G06Q 20/102; H04W 12/50; H04W 12/06; G06F 21/445; G06F 16/00
See application file for complete search history.

(56) References Cited

U.S. PATENT DOCUMENTS

| | | | | |
|---|---|---|---|---|
| 8,560,447 B1 * | 10/2013 | Hinghole | G06Q 20/14 | 705/40 |
| 2004/0098474 A1 * | 5/2004 | Galou | H04L 41/0806 | 709/223 |
| 2011/0202459 A1 | 8/2011 | Shah et al. | | |
| 2012/0221420 A1 * | 8/2012 | Ross | G06Q 40/00 | 705/16 |
| 2013/0060680 A1 * | 3/2013 | Oskolkov | G06Q 20/227 | 705/39 |
| 2013/0060684 A1 * | 3/2013 | Oskolkov | G06Q 10/10 | 705/40 |

(Continued)

FOREIGN PATENT DOCUMENTS

| | | | | |
|---|---|---|---|---|
| CA | 2884709 A1 * | 9/2015 | | G06Q 20/10 |
| WO | WO-2016057827 A1 * | 4/2016 | | G06Q 20/405 |

*Primary Examiner* — Jacob C. Coppola
(74) *Attorney, Agent, or Firm* — Kilpatrick Townsend & Stockton LLP; Michael A. Springs, Esq.

(57) ABSTRACT

A transmission pairing system may include a transmission pairing stored in a secure database. The system may generate a transmission pairing by receiving a selection of a destination for the secure information from the secure database and determining a transmission type corresponding to the selected destination. The system may populate a list of available sources of the secure information based on the transmission type. A selected source may be received and paired with the selected destination to generate the transmission pairing. The transmission pairing may be used to initiate an electronic transmission based on a parameter that is modifiable to determine the secure information transmitted from the source to the destination.

20 Claims, 10 Drawing Sheets

(56) References Cited

U.S. PATENT DOCUMENTS

| | | | |
|---|---|---|---|
| 2013/0103577 A1* | 4/2013 | Lawson | G06Q 20/10 |
| | | | 705/39 |
| 2013/0117174 A1* | 5/2013 | Cole | G06Q 40/02 |
| | | | 705/39 |
| 2013/0212708 A1* | 8/2013 | Hazan | H04L 29/08729 |
| | | | 726/29 |
| 2014/0122302 A1* | 5/2014 | Tofighbakhsh | G06Q 30/04 |
| | | | 705/27.1 |
| 2015/0178693 A1* | 6/2015 | Solis | G06Q 20/027 |
| | | | 705/30 |
| 2015/0262183 A1* | 9/2015 | Gervais | G06Q 20/405 |
| | | | 705/44 |

* cited by examiner

SECURE TRANSMISSION-PAIRING DATABASE SYSTEM

CROSS-REFERENCE TO RELATED APPLICATION

This claims priority to U.S. Provisional Application Ser. No. 62/160,941, filed May 13, 2015 and titled "Web-Based Secured Transmission Pairing System," the contents of which are incorporated herein by reference.

TECHNICAL FIELD

The present disclosure relates to secure database systems, and more particularly, though not necessarily exclusively, to using stored transmission pairings with a modifiable parameter to initiate electronic transmissions of secure information.

BACKGROUND

Some systems may be accessible via a network, such as the Internet, to structure and implement transmissions of information securely from a source to a destination. The transmission details may be stored and used to execute additional transmissions of an identical type. But, for future transmissions that are not identical to the stored transmission, such systems must recommence the process of structuring and implementing the transmission, regardless of the similarities between the transmissions.

SUMMARY

In some aspects, a system may include a secure database having (1) a plurality of source identifiers corresponding to sources from which secure information is electronically transmittable and (2) a plurality of destination identifiers corresponding to destinations to which the secure information is electronically transmittable. The plurality of source identifiers may be linked with a user identifier in the secure database. The user identifier may correspond to a user of a user device. The secure information may include user information that is accessible by the user from the user device subsequent to an authentication of the user. The system may also include a processor communicatively coupled to the secure database. The system may also include a memory communicatively coupled to the processor and including instructions that are executable by the processor for causing the processor to generate a first user interface displayable on the user device communicatively coupled to the processor via a network. The first user interface may include a list of available destinations corresponding to a set of destination identifiers of the plurality of destination identifiers. The instructions may also be executable by the processor for causing the processor to receive, from the user device via the network, a first selection corresponding to a destination from the list of available destinations. The instructions may also be executable by the processor for causing the processor to determine a transmission type based on the destination. The instructions may also be executable by the processor for causing the processor to generate a second user interface displayable on the user device and including a list of available sources corresponding to a set of source identifiers of the plurality of source identifiers. The set of source identifiers may correspond to the transmission type. The instructions may also be executable by the processor for causing the processor to receive, from the user device via the network, a second selection corresponding to a source from the list of available destinations. The instructions may also be executable by the processor for causing the processor to generate a transmission pairing including the source and the destination by linking a source identifier corresponding to the source and a destination identifier corresponding to the destination in the secure database. The instructions may also be executable by the processor for causing the processor to link the transmission pairing with the user identifier in the secure database. The instructions may also be executable by the processor for causing the processor to generate a third user interface displayable on the user device and including a selection option corresponding to the transmission pairing and selectable by the user device to initiate a transmission process in which the secure information is electronically transmitted from the source to the destination to modify source information and destination information based on a parameter received from the user via the user device subsequent to a selection of the selection option.

In some aspects, a method may include receiving, from a user via a user device, a request to generate a transmission pairing. The method may also include displaying a first list of a plurality of available destinations for the transmission pairing. The plurality of available destinations may correspond to destinations to which secure information is electronically transmittable. The method may also include receiving a first selection corresponding to a destination from the first list. The method may also include determining a transmission type based on the destination. The method may also include displaying a second list of a plurality of available sources corresponding to the transmission type. The plurality of available sources may include sources from which secure information is electronically transmittable. The method may also include receiving a second selection corresponding to a source from the second list. The method may also include generating the transmission pairing including the source and the destination by linking a source identifier corresponding to the source and a destination identifier corresponding to the destination in a secure database. The method may also include linking the transmission pairing with a user identifier in the secure database, the user identifier corresponding to the user. The method may also include displaying a selection option corresponding to the transmission pairing and selectable by the user device to initiate a transmission process in which the secure information is electronically transmitted from the source to the destination to modify source information and destination information based on a parameter received from the user via the user device subsequent to a selection of the selection option.

In some aspects, a system may include a secure database including a plurality of memory locations. Each memory location in the plurality of memory locations may be linked to at least one other memory location in the plurality of memory locations. The plurality of memory locations may include a plurality of user identifiers. The plurality of memory locations may also include a plurality of transmission pairings. Each transmission pairing of the plurality of transmission pairings may include a source identifier corresponding to a source linked with a destination identifier corresponding to a destination, the source having source information from which secure information is electronically transmittable. The destination may have destination information to which the secure information is electronically transmittable, the secure information including user information that is accessible by a user from a user device subsequent to an authentication of the user. The plurality of memory locations may also include authentication information corresponding to a plurality of users and including user authentication information for authenticating each user of the plurality of users to access the secure information via user devices communicatively coupled to the secure database by a network. The system may also include a memory communicatively coupled to the secure database and including instructions that are executable by a processor for causing the processor to generate a first user interface displaying at least one transmission pairing of the plurality of transmission pairings and at least one selection option corresponding to the at least one transmission pairing. The at least one transmission pairing may include a first source and a first destination, where a first source identifier corresponding to the first source may be linked to a first destination identifier corresponding to the first destination in the secure database. The at least one selection option may be selectable by the user via the user device to transmit a request signal corresponding to a request to initiate an electronic transmission of the secure information from the first source to the first destination. The instructions may also be executable by a processor for causing the processor to generate, in response to receiving the request signal, a second user interface including the first source, the first destination, and a first input option selectable by the user via the user device to input a parameter. The instructions may also be executable by a processor for causing the processor to initiate the electronic transmission of the secure information from the first source to the first destination based on the parameter.

DETAILED DESCRIPTION

Figure 1:
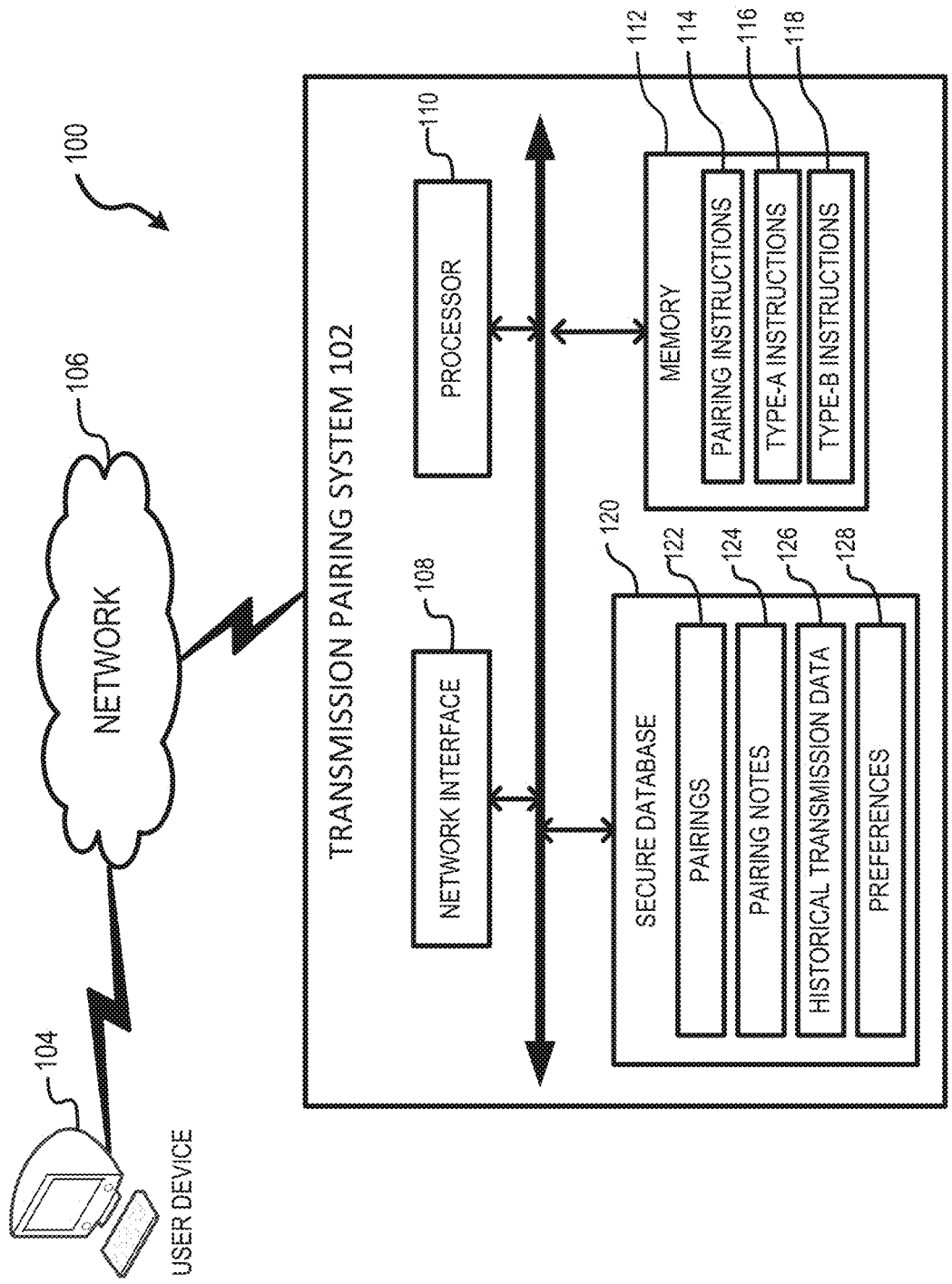
FIG. 1 is a block diagram depicting a network environment including a transmission pairing system according to some aspects of the present disclosure.

Certain aspects and examples of the present disclosure relate to a secure database including a stored transmission pairing that may be used to initiate a transmission of secure information from a source to a destination in a manner that modifies secure information corresponding to the source and the destination based on a modifiable parameter. The parameter may be received from a user via a user device to determine the secure information to be transmitted from the source to the destination and define the parameters by which the secure information at the source and the destination be modified. In some aspects, a system may execute a validation process to determine if the source is able to transmit the secure information to the destination based on the parameter prior to initiating the electronic transmission. For example, the system may determine if the secure information at the source is modifiable based on the parameter.

The transmission pairing stored in the secure database may be generated in response to a request by the user. In some aspects, the system may generate a user interface including a list of available destinations for the transmission pairings. The destinations may correspond to accounts or other information stored in the secure database and available to receive secure information. The system may determine the type of transmission for the transmission pairing based on the type of destination selected by the user. For example, a destination corresponding to an account or other location managed by the user may implicate a first type of transmission while a destination corresponding to an account managed by a third party may implicate a second type of transmission. The system may populate a list with sources corresponding to the determined transmission type and available for transmitting secure information to the selected destination. Upon selection of a source from the list, the system may generate the transmission pairing by associating the source with the destination in the database. The transmission pairing may be associated with the user to allow the user to access the transmission pairing for initiating a transmission.

A system according to some aspects may provide quick initiation of frequent electronic transmissions of secure information while accounting for important parameter changes that may exist each time the transmission is initiated. Unlike current systems that may operate under an assumption that an electronic transmission between a source and a destination is identical each time it is initiated, the parameter may be modified to initiate a unique transmission using the same transmission pairing. The ability to modify an aspect of the transmission without restructuring an entirely new transmission having the same source and destination may reduce bandwidth on a network when completing frequent transmission. Further, a transmission pairing according to some aspects of the present disclosure may result in a significant amount of memory saved in the database as a single transmission pairing for each user may replace multiple stored transmission pairings having the same source-destination pairing, but slightly different parameters corresponding to the secure information transmitted from the source to the destination.

Various aspects of the present disclosure may be implemented in various environments. FIG. 1 is a block diagram depicting a network environment 100 including a transmission pairing system 102 according to some aspects of the present disclosure. The transmission pairing system 102 is communicatively coupled to a user device 104 via a network 106, such as the Internet. The transmission pairing system 102 includes a network interface 108 coupled to a processor 110 and a memory 112 via a bus. The network interface 108 may include a network card or other device communicatively coupled to the network 106 to allow user devices, such as the user device 104, to access the transmission pairing system 102 for generating a transmission pairing and initiating transmissions using the transmission pairing. In some aspects, the network interface 108 may transmit user interfaces generated by the processor 110 via the network 106 to the user device 104.

The processor 110 may execute instructions stored in the memory 112 to perform the operations of the transmission pairing system 102. The processor 110 may include a single processing device or multiple processing devices. Non-limiting examples of the processor 110 include a field-programmable gate array, an application-specific integrated circuit ("ASIC"), and a microprocessor. The memory 112 includes a storage device that retains information when powered off. Non-limiting examples of the memory 112 include electrically erasable and programmable read-only memory, a flash memory, or any other type of non-volatile memory.

In some examples, at least a portion of the memory 112 may include a computer-readable medium from which the processor 110 can read instructions of the memory 112. A computer-readable medium may include electrical, optical, magnetic, or other storage devices capable of providing the processor 110 with computer-readable instructions or other program code. Non-limiting examples of a computer-readable medium include magnetic disks, memory chips, read-only memory, random-access memory, an ASIC, a configured processor, optical storage, or any other medium from which the processor 110 may read instructions. The instructions may include processor-specific instructions generated by a compiler or an interpreter from code written in any suitable computer-programming language, including, for example, C, C++, C#, COBOL, Java, etc.

The instructions in the memory 112 include pairing instructions 114. The pairing instructions 114 may include instructions to cause the processor 110 to generate a transmission pairing by linking sources and destinations of secure information. The pairing instructions 114 may also include instructions to determine a transmission type based on the destination of the generated pairing and to identify available sources corresponding to the transmission type. In some aspects, the transmission type may include at least a Type-A transmission and a Type-B transmission. In some examples, the Type-A transmissions may correspond to transmissions in which secure information is transmitted from a source to a destination, where the source and destination are both held by a common owner. In a particular example, the source and the destination may correspond to financial accounts held by the same account holder. The transmission may relate to a transfer of monetary information from the source to the destination. In other examples, the Type-A transmissions may correspond to other types of transmissions, including, but not limited to, transmissions in which the source and the destination are both of a similar type (e.g., individually held checking accounts). In some examples, the Type-B transmissions may correspond to transmissions in which the source and destination are held by different owners, such as a payment transmission in which monetary information is transmitted from a source account held by a first entity or individual to a destination account held by a second entity or individual. In other aspects, the Type-B transmissions may correspond to other types of transmissions, including, but not limited to, transmissions between different types of accounts (e.g., an individual checking account to a corporate checking account). Although only two types of transmission are described, the transmission pairing system 102 may initiate any number of transmission types, including one. In some aspects, the pairing instructions 114 may be executed by the processor 110 to generate one or more user interfaces to allow a user of the user device 104 to generate a transmission pairing and to display one or more generated transmission pairings on a display unit of the user device 104.

The memory 112 also includes Type-A instructions 116 and Type-B instructions 118. The Type-A instructions 116 and the Type-B instructions 118 may include instructions for initiating transmissions of types A and B, respectively, in response to a user selection of the transmission pairing from a user interface generated by the processor 110 using the pairing instructions 114. In some aspects, the Type-A instructions 116 and the Type-B instructions 118 may cause the processor 110 to transmit secure information from a source to a destination by modifying information at the source and information at the destination by a parameter selected by the user. In some aspects, the Type-A instructions 116 and the Type-B instructions may cause the processor 110 to generate one or more user interfaces to allow a user to input the parameter for the transmission of secure information.

The transmission pairing system 102 also includes a secure database 120. The secure database 120 may include a single database or multiple databases including information to facilitate the transmission of secure information from a source to a destination. In some aspects, secure database 120 may include source identifiers and destination identifiers that may be linked together to generate transmission pairings 122. The transmission pairings 122 may be displayed on the user device 104 and selected to initiate a transmission of secure information from a source to a destination linked to the source. The secure database 120 also includes pairing notes 124. The pairing notes 124 may include instructions, comments, textual memoranda, or other instructive notes corresponding to the transmission pairings 122. In some aspects, the user interfaces generated by the pairing instructions 114 may allow a user to input text that may be stored in the secure database 120 and associated, or otherwise linked, to a pairing 122 in the secure database 120. Historical transmission data 126 and preferences 128 are also included in the secure database 120. The historical transmission data 126 may include information corresponding to transmissions previously initiated by a user. In some aspects, the historical transmission data 126 may include sources and destinations of the previously initiated transmissions. The preferences 128 include user preferences for the display of the transmission pairings 122. For example, the preferences 128 may include an order in which the transmission pairings may be displayed on a user interface generated by the processor 110. In another example, the preferences 128 may include user device information and a user's previously selected preferences on which user devices to display which transmission pairings 122 (e.g., a first transmission pairing displayed on a first user device and a second transmission pairing displayed on a second user device).

The user device 104 may represent one or more user devices communicatively coupled to the transmission pairing system 102 via the network 106. The user device 104 may be a computing device, such as a laptop, mobile phone, desktop computer, personal digital assistant, tablet, etc., that may display content in a web browser or other user interface. The transmission pairing system may receive requests and commands from the user device 104 via the network 106 and configure the user interfaces to be provided to the user device 104 in response to the requests and commands.

Figure 2:
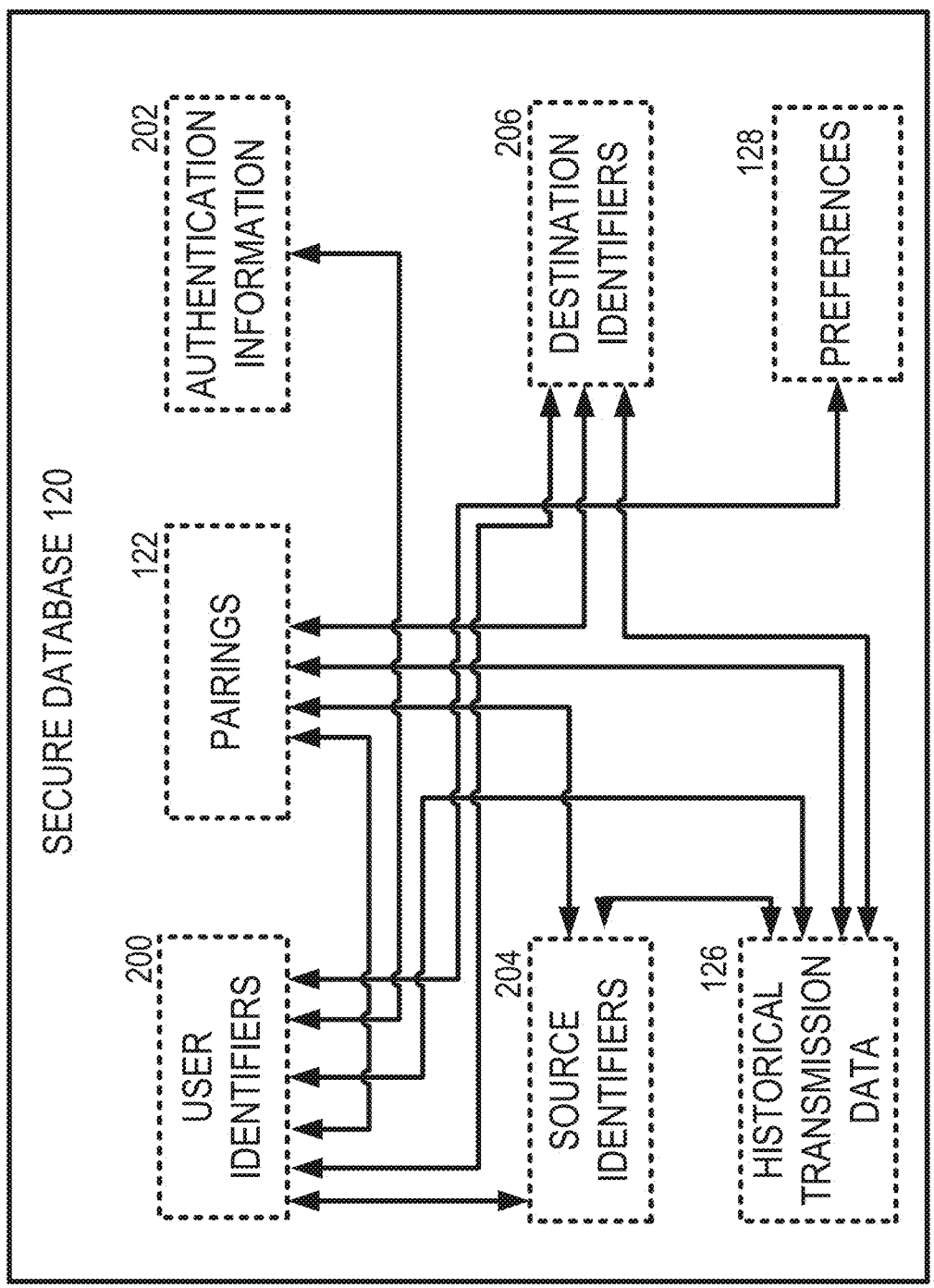
FIG. 2 is a block diagram depicting memory locations in a secure database of the transmission pairing system according to some aspects of the present disclosure.

FIG. 2 is a block diagram depicting memory locations in the secure database 120 of the transmission pairing system 102 according to some aspects of the present disclosure. The secure database 120 may link, or otherwise associate, information within each memory location to facilitate generating the transmission pairings 122 and initiating transmissions based on the transmission pairings 122. In some aspects, the information within each location may be linked in or more indices in the secure database 120. For example, an index may include one or more columns, each including information that is associated with other information in the same column of the index. In additional and alternative aspects, the information may be linked using pointers, objects, or other means for associating information in the secure database 120. In some aspects, the information stored in the secure database 120 may be separated or partitioned by information type to allow the processor 110 of the transmission pairing system 102 of FIG. 1 to query information based on a first type and use the links to determine information of a second type linked to the first type of information. Although the secure database 120 is depicted as a single database in FIG. 2, the secure database 120 may include multiple databases including associated memory locations.

User identifiers 200 are stored in the secure database 120 and include information corresponding to an identity of an account holder, member, or other user of the transmission pairing system 102. In some aspects, the user identifiers 200 may include a unique set of alphanumeric characters, such as an online banking ("OLB") number assigned to accountholders to distinguish holders of each account managed by a financial institution. In other aspects, the user identifiers 200 may include a unique set of alphanumeric characters provided by or issued to each user, including, but not limited to, a social security number.

The secure database 120 also includes authentication information 202. The authentication information 202 may include information for authenticating a user to access the secure database 120 to generate the transmission pairings 122 and to view and transmit secure information stored in the secure database 120. In some aspects, the authentication information 202 may include information provided by the user, including, but not limited to, a username, password, social security number, passcode, or other authenticating information. In other aspects, the authentication information 202 may include information provided to the user, such as, but not limited to, a personal identification number ("PIN"). The authentication information 202 may be stored in the secure database 120 and compared with input from the user via the user device 104 of FIG. 1 for a match to conclude that the user is authorized to view and transmit the secure information.

The secure database 120 also includes source identifiers 204 and destination identifiers 206. In some aspects, the source identifiers 204 may include account information, devices, locations or other identifiers of secure information at source, at least a portion of which may be transmitted to a destination. In some aspects, the accounts associated with the source identifiers 204 in the secure database 120 may be stored in a remote database. The destination identifiers 206 may include account information, devices, locations, or other identifiers of destinations that may receive the secure information. For example, a source identifier 204 and a destination identifier 206 may correspond to financial account information. For example, the source identifier 204 may include account numbers and routing numbers associated with the account. In some aspects, the source identifier 204 may also include balance information corresponding to an amount of money available in the source account. The destination identifier 206 may include account numbers and routing numbers. In some aspects, the accounts associated with the destination identifiers 206 in the secure database 120 may be stored in a remote database. A transmission from the source to the destination may include transmitting monetary information from the source to the destination. The value of the monetary information (e.g., the amount of money transmitted) may be a parameter selected by the user via the user device 104 and may cause secure source information and secure destination information to be modified by the parameter. For example, the parameter may be a fifty-dollar value, and the balance of the source account may be deducted by fifty dollars while the balance of the destination account may be increased by fifty dollars.

The source and the destination may be included in a transmission pairing. For example, a source identifier 204 and a destination identifier 206 may be linked in the secure database 120 to form a transmission pairing 122. In some aspects, the transmission pairing 122 may include a copy of the source identifier 204 and the destination identifier 206 forming the transmission pairing. In other aspects, the transmission pairings 122 may include links, objects, or other references to the source identifiers 204 (or the source) and the destination identifiers 206 (or the destination) forming the transmission pairings 122. The secure database 120 also includes the historical transmission data 126 and the preferences 128 described in FIG. 2.

The transmission pairings 122 may be linked to the user identifiers 200 to allow the user to access and view the appropriate transmission pairings from the user device. For example, subsequent to authenticating the user, the transmission pairing system 102 of FIG. 1 may generate a user interface displaying the transmission pairings 122 linked to the user identifier associated with the authentication information 202 received from the user via the user device 104 of FIG. 1. The source identifiers 204 and the destination identifiers 206 may be linked to form the transmission pairings 122. The source identifiers 204 and the destination identifiers 206 may also be linked and stored as historical transmission data 126 subsequent to a transmission initiated by the user involving a source and a destination. The source identifiers 204 and the destination identifiers 206 may also be linked to the user identifiers 200 to allow the transmission pairing system 102 to generate a list of available sources and available destinations for selection by the user to generate the transmission pairings 122. In some aspects, the source identifiers 204 may be further linked with the user identifiers 200 to allow the user to access secure information in the source identifier 204 for transmitting to a destination identifier 206.

The historical transmission data 126 may also be linked to one or more of the transmission pairings 122 to allow the transmission pairing system 102 of FIG. 1 to generate a transmission pairing 122 using a previously initiated transmission. The preferences 128 may be linked to the user identifiers 200 to allow the transmission pairing system 102 to determine the user's preferences for displaying the transmission pairings 122 on the user device 104.

Generating a Transmission Pairing

Figure 3:
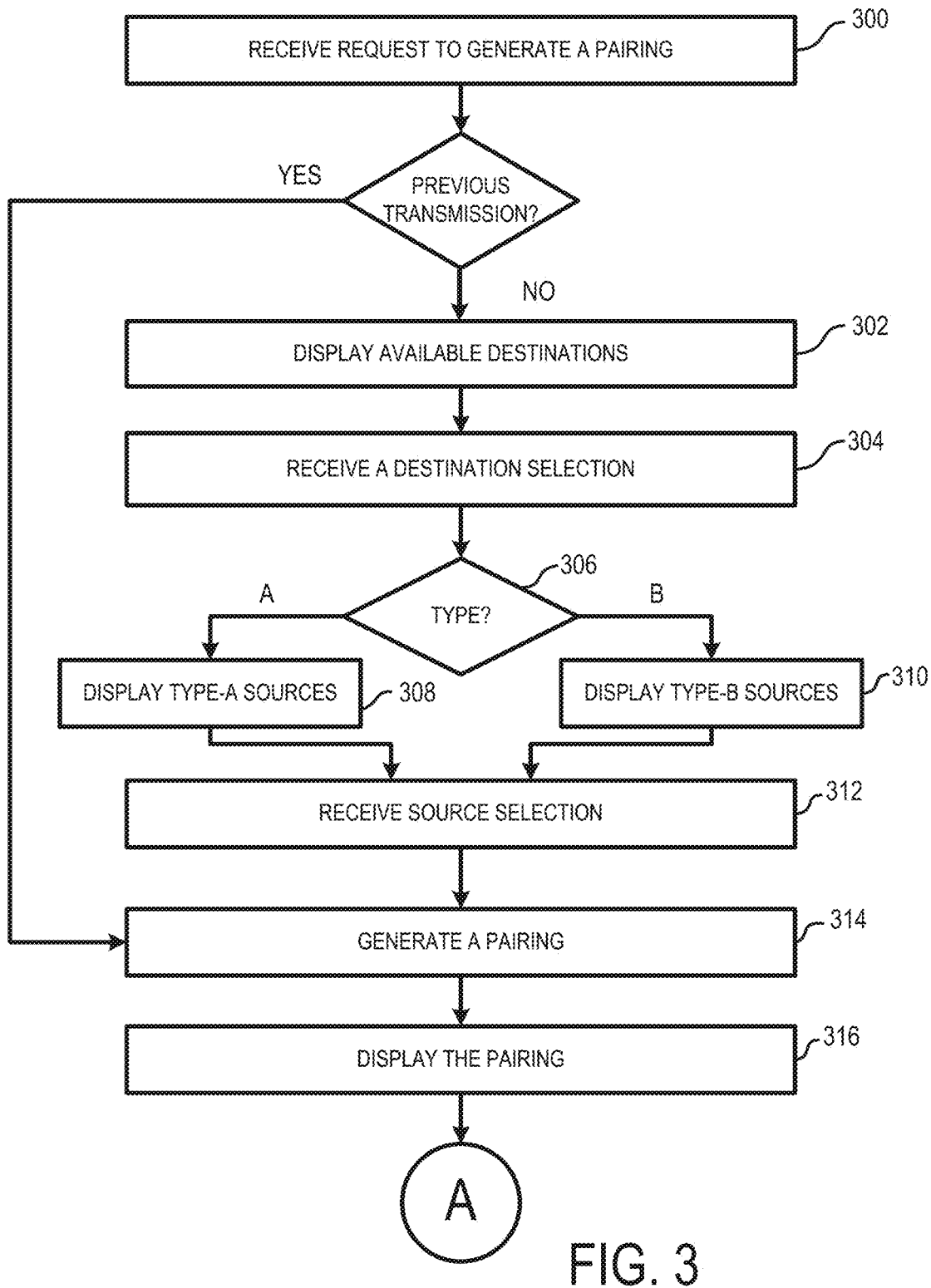
FIG. 3 is a flow chart of a process for generating a transmission pairing according to some aspects of the present disclosure.

FIG. 3 is a flow chart of a process for generating a transmission pairing according to some aspects of the present disclosure. The process is described with respect to the network environment 100 of FIG. 1 and the secure database 120 of FIGS. 1 and 2, although other implementations are possible without departing from the scope of the present disclosure.

In block 300, a request is received from the user to generate a transmission pairing 122. The request may be received by the transmission pairing system 102 from the user via the user device 104. In some aspects, the request may be received in response to a user selecting a selection option displayed on a user interface on the user device 104 corresponding to the request. Selecting the selection option may generate a request signal that is transmitted from the user device 104 to the user device 104 to the transmission pairing system 102 via the network 106 and processed by the processor 110.

In block 302, available destinations 206 are displayed. In some aspects, the processor 210 may generate a user interface including one or more available destination 206 to which secure information may be transmitted by the user. The transmission pairing system 102 may display the available destinations for a selection by the user of a destination for the transmission pairing. In some aspects, the transmission pairing system 102 may display the available destinations in the form of a list (e.g., a drop-down menu). The transmission pairing system 102 may display a user interface that includes a webpage configured to display one or more destinations and receive a selection corresponding to a user's selection of a destination from the available destinations. The available destinations may be stored in the secure database 120 and retrieved by the transmission pairing system 102 subsequent to the user being authenticated by the transmission pairing system 102. In some aspects, the transmission pairing system 102 may not display all of the available destinations. For example, the transmission pairing system 102 may display a portion of the available destinations with an option to view additional available destinations. This may prevent cluttering the list with destinations that may be less likely for selection by the user. For example, the transmission pairing system 102 may display only available destinations that a user has recently initiated a transmission. For example, destinations stored in the historical transmission data 126 and linked to the user identifier 200 of the user may be displayed first followed by additional destinations 206. The user may select the option to view other available destinations.

In block 304, the transmission pairing system 102 receives a selection of a destination from the available destinations. The destination selection may be received as an input in response to a selection of a destination from the available destinations displayed on a user interface.

In block 306, the transmission pairing system 102 may determine a transmission type. The transmission type may be based on the selection of the destination. In some aspects, the transmission type may be determined using the destination type. Certain types of destinations may indicate that the transmission of secure information to the destinations is of a particular type. For example, the destination selection received in block 304 may correspond to a destination previously linked to the user identifier 200 of the user, indicating that the destination is owned or otherwise managed by the user. The ownership of the destination by the user may indicate that the transmission of information from a source to the destination is of a Type-A corresponding to transmitting secure information between commonly owned locations (e.g., a source and a destination both owned by the user). In another example, the destination selection received in block 304 may correspond to a destination associated with a user identifier 200 of a third party (e.g., the destination is not owned or managed by the user). The ownership of the destination by a third party may indicate that the transmission of information is of a Type-B that is different from a Type-A transmission (e.g., a source and a destination owned by separate entities).

In response to identifying the transmission type, the transmission pairing system 102 may determine a list of available sources corresponding to the type. For example, the transmission pairing system 102 may determine sources available to transmit secure information to the selected destination using a Type-A transmission upon determining that the destination selection corresponds to a Type-A transmission. In another example, the transmission pairing system 102 may determine sources available to transmit secure information to the selected destination using a Type-B transmission upon determining that the destination selection corresponds to a Type-B transmission.

In block 308, the transmission pairing system 102 displays one or more sources available for a Type-A transmission in response to a determination that the transmission is a Type-A transmission. In block 310, the transmission pairing system 102 displays one or more sources available for a Type-B transmission in response to a determination that the transmission is a Type-B transmission. In some aspects, the transmission pairing system 102 may generate a user interface to display the available sources on the user device 104. In some aspects, the user interface may include a modified version of the user interface displaying the available destinations in block 302. For example, the user interface described in block 302 may be updated to include the list of available destinations and a second list (e.g., a second pull-down menu) including the available sources. The available sources may include selection options to allow the user to select a source for pairing with the destination selected in block 304.

In block 310, the transmission pairing system 102 displays the available sources. The transmission pairing system 102 may display a user interface that includes a webpage configured to display one or more sources and receive an input or selection corresponding to a user's selection of a source from the available sources. The user interface may further include the selected destination (or a list of available destinations) displayed in addition to the available sources. In some examples, the available sources may be displayed as a drop-down menu.

In block 312, the transmission pairing system 102 receives a selection of a source. The source selection may be received in response to a selection of a source from available sources displayed on a user interface.

In block 314, a transmission pairing is generated using the destination selection received in block 304 and the source selection received in block 312. The transmission pairing may be generated by the transmission pairing system 102. Generating the transmission pairing may include associating or otherwise linking the selected source and the selected destination in the secure database 120. In some aspects, the transmission pair may be stored separately from the sources 204 and the destinations 206 in the secure database 120. In other aspects, the transmission pair may include links, objects, or other references to the destination and the source included in the transmission pairing. The transmission pairing may also be linked to the user identifier 200 of the user to allow the transmission pairing to be displayed on the user device subsequent to the user being authenticated to access the secure database 120. In some aspects, generating the transmission pairing may also include additional validations related to the selected destination and selected source. For example, the transmission pairing system 102 may verify that the destination and source still exist in the secure database or that other criteria for the transmissions pairing are satisfied prior to storing the transmission pairing in the secure database 120.

In block 316, the transmission pairing system 102 displays the transmission pairing. The transmission pairing system 102 may generate a user interface including the transmission pairing and a selection option corresponding to the selection that may be selected by the user to initiate a transmission of secure information from the source received in block 312 to the destination received in block 304. In some aspects, the user interface may include a list of transmission pairings previously generated by the transmission pairing system 102. In some examples, the transmission pairing or list of transmission pairings may be displayed as a widget or button on a user interface.

In some aspects, the transmission pairing system 102 may generate a pairing as described in block 314 from a previous transmission. For example, subsequent to receiving a request to generate a pairing as described in block 300, the transmission pairing system 102 may determine that the request was transmitted in response to a user selection of a selection option displayed with a confirmation of a previous transmission. In response to receiving the request from the selection option, the transmission pairing system 102 may generate a transmission pairing using the source and the destination of the previous transmission as the source and destination for the transmission pairing.

In some aspects, the transmission pairing system 102 may also allow an instructive note to be linked to the transmission pairing. For example, the user interface generated in blocks 302, 308, or 310 may include an input option that may be selected by the user via the user device to input alphanumeric text that may be displayed with the transmission pairing as described in block 316. In some aspects, the transmission pairing system 102 may store the note with the pairing note 124 in the database and associate it with the transmission pairings. In other aspects, the transmission pairing system 102 may store the note with the transmission pairings 122 themselves.

Illustrative Example of Transmission Pairings

Figure 4:
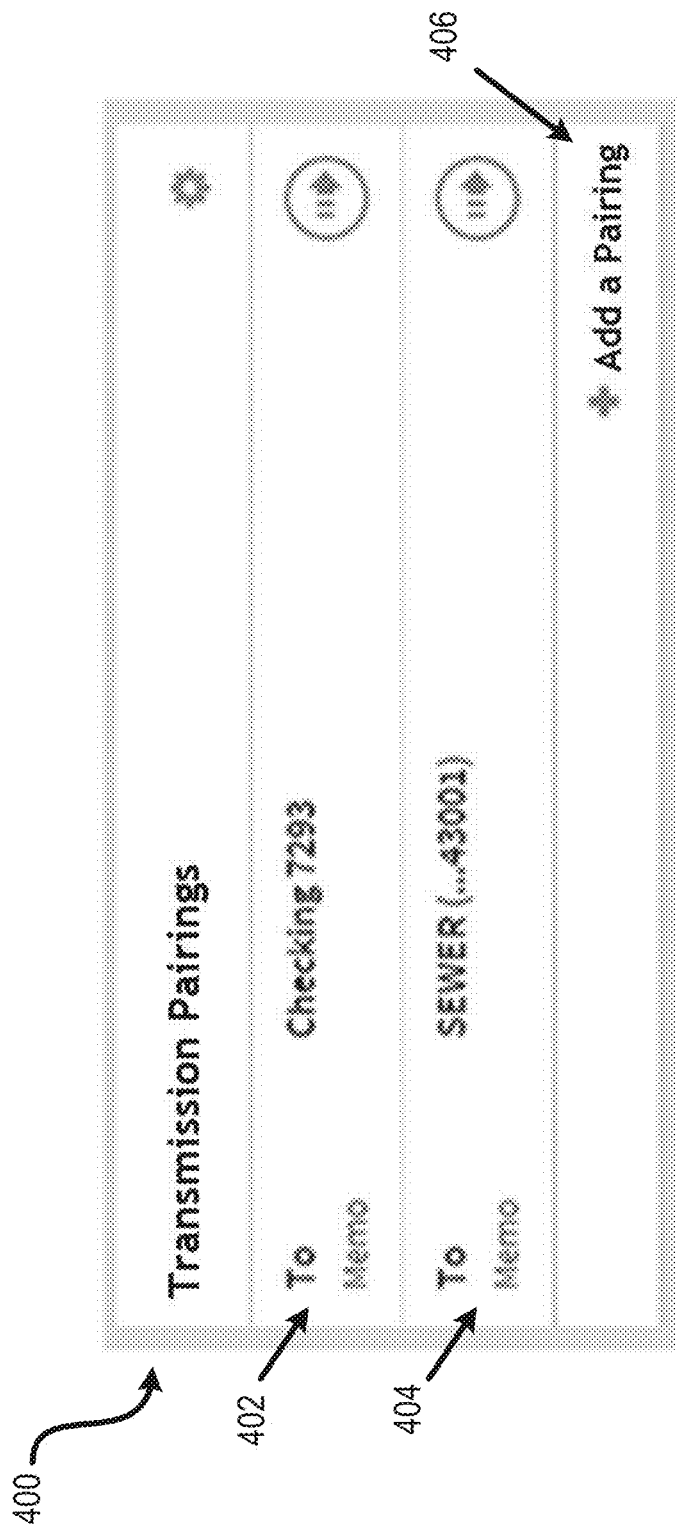
FIG. 4 is an example of a user interface displaying transmission pairings according to some aspects of the present disclosure.

FIG. 4 is an example of a user interface 400 displaying transmission pairings 402, 404 according to some aspects of the present disclosure. In some aspects, the user interface may be generated by the transmission pairing system 102 and transmitted to the user device 104 via the network 106 for display on a display unit of the user device 104. The transmission pairings 402, 404 include a name of the destination to which secure information may be transmitted using the transmission pairings 402, 404. For example, the transmission pairing 402 indicates that it may be selected by the user to initiate a transmission to a financial checking account. The transmission pairing 404 indicates that it may be selected by the user to initiate a transmission to a sewer utility company's financial account. The user interface 400 also includes a selection option 406, labeled "Add a Pairing," that may be selected by the user via the user device to generate a new transmission pairing. Selecting the selection option 406 may initiate the process of FIG. 3.

Figure 5:
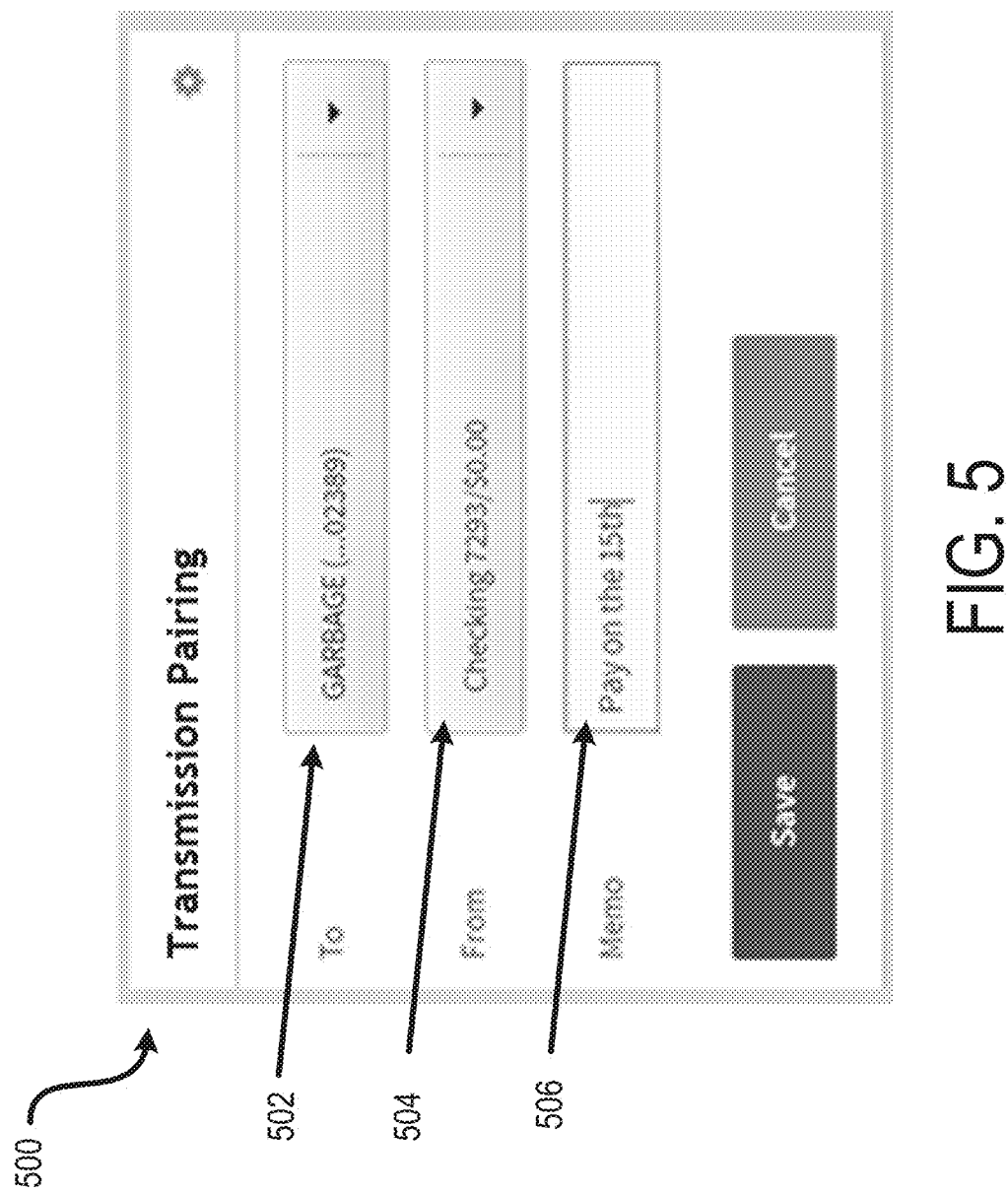
FIG. 5 is an example of a user interface for generating a transmission pairing according to some aspects of the present disclosure.

FIG. 5 is an example of a user interface 500 for generating a new transmission pairing according to some aspects of the present disclosure. The user interface 500 may be generated by the transmission pairing system 102 in response to a selection of the selection option 406 in FIG. 4. The user interface includes a drop-down menu 502 including a list of available destinations that may be selected as the destination for the transmission pairing. In some aspects, the list may be generated as described in block 302 of FIG. 3. The user interface indicates that the selected destination is a garbage utility company. Based on the selection of the garbage utility company as the destination, the transmission pairing system 102 may determine that the transmission type corresponds to a payment. The transmission pairing system 102 may populate the drop-down menu 504 with a list of available sources for a payment transmission. In some aspects, the list may be generated as described in blocks 308, 310 of FIG. 3.

The user interface 500 also includes an input option 506 that may be selected by the user via the user device 104 to enter an instructive note. The note includes alphanumeric text received from the user using a keyboard of the user device 104. The transmission pairing system 102 may store the note entered in the input option 506 in the database and associate it with the transmission pairing to allow the note to be displayed with the transmission pairing.

Figure 6:
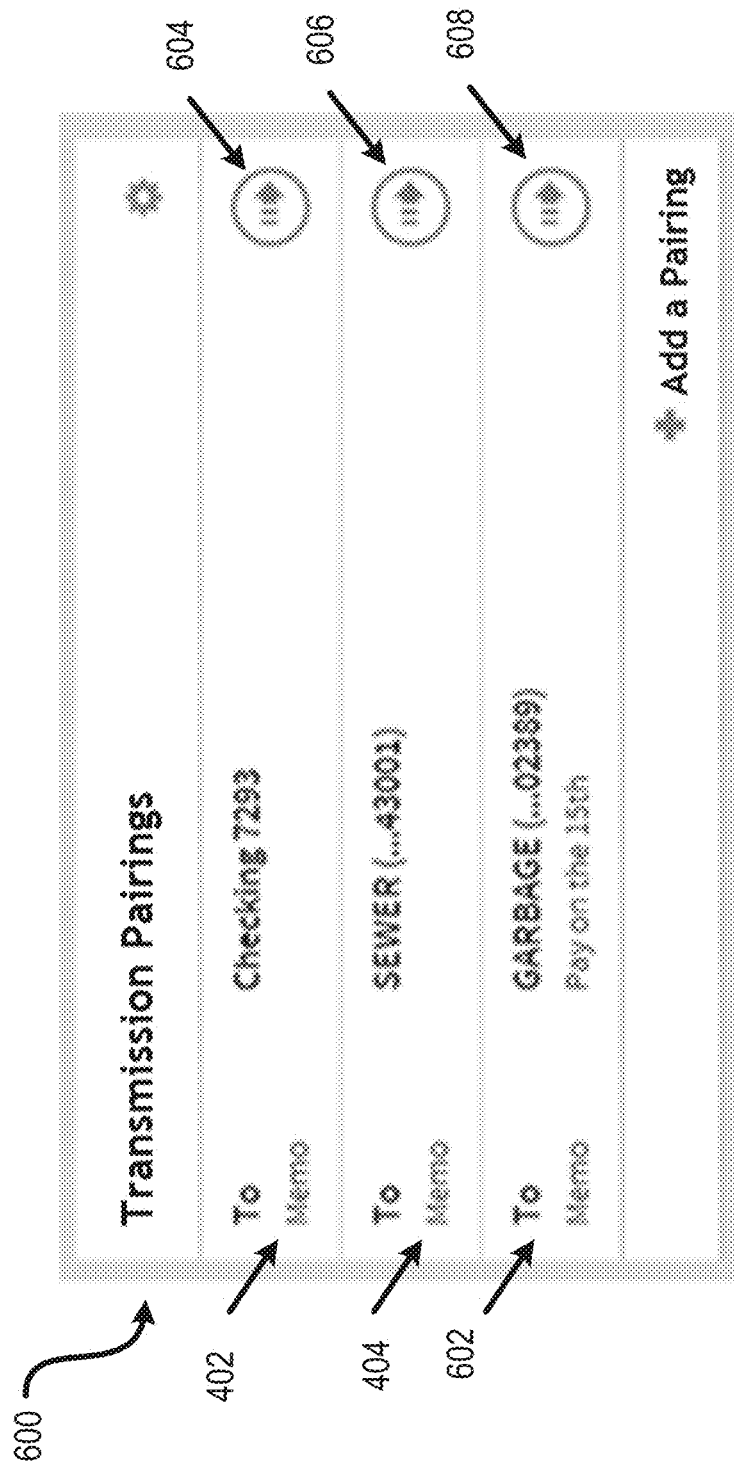
FIG. 6 is an example of a user interface displaying the transmission pairing of FIG. 5 according to some aspects of the present disclosure.

FIG. 6 is an example of a user interface 600 displaying the transmission pairing of FIG. 5 according to some aspects of the present disclosure. The user interface 600 includes the transmission pairings 402, 404 of FIG. 4 and an additional transmission pairing 602 for initiating a transmission between the source and the destination selected by the user from the user interface 500 of FIG. 5. The transmission pairing 602 also includes the instructive note displayed with the transmission pairing 602. Each of the transmission pairings 402, 404, 602 includes a selection option 604, 606, 608, respectively, corresponding to the transmission pairing 502, 504, 602. The selection options 604, 606, 608 may transmit a signal from the user device 104 to the transmission pairing system 102 to initiate a transmission process to transmit secure information between the source and destination included in the transmission pairing. The transmission pairings display the destination to which secure information may be transmitted. Based on the destination of a checking account, the transmission pairing 502 may correspond to a transfer type of transmission from one account held by the user to the checking account also held by the user. Based on the destination of a sewer utility company and a garbage utility company, the transmission pairings 404, 602 may correspond to a payment type of transmission from an account held by the user to an account held by a third party.

Figure 7:
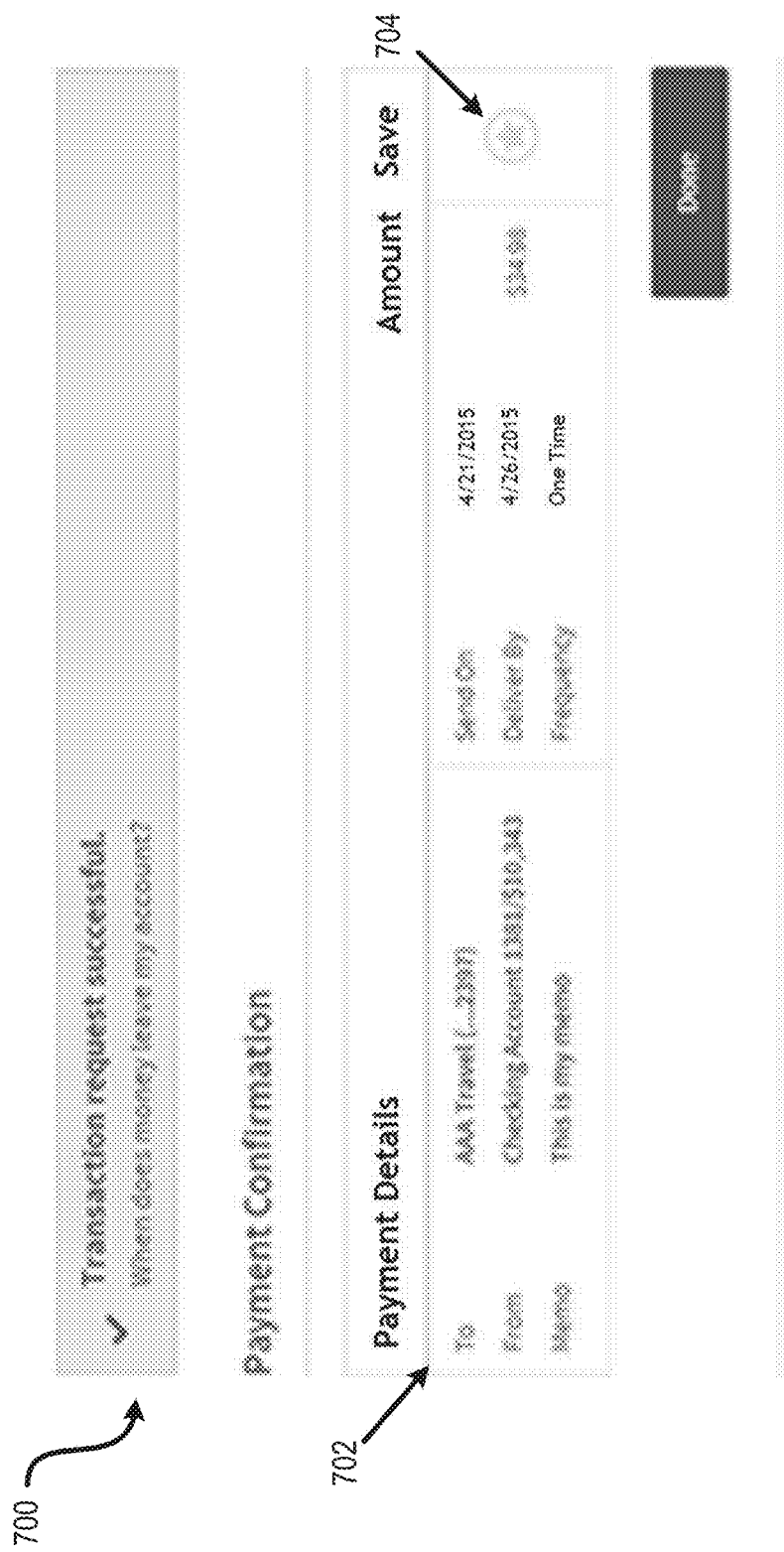
FIG. 7 is an example of a user interface displaying an executed transmission with a selection option to generate a transmission pairing according to some aspects of the present disclosure.

FIG. 7 is an example of a user interface 700 displaying details 702 corresponding to an executed transmission according to some aspects of the present disclosure. The transmission relates to a payment and includes a destination of a corporate account (e.g., AA Travel). The source is a checking account held by the user. The transmission also includes an instructive note (e.g., a "memo") submitted with the transmission. In some aspects, all or a portion of the transmission details (e.g., the source and the destination) may be stored in the secure database 120 as historical transmission data 208. The user interface 700 includes a selection option 704 that may be selected by the user to save the source and the destination of the transmission as a transmission pairing. In some aspects, the transmission pairing system 102 may generate a transmission pairing using the source and the destination from the executed transmission via the process described in block 314.

Initiating a Transmission Using a Transmission Pairing

Figure 8:
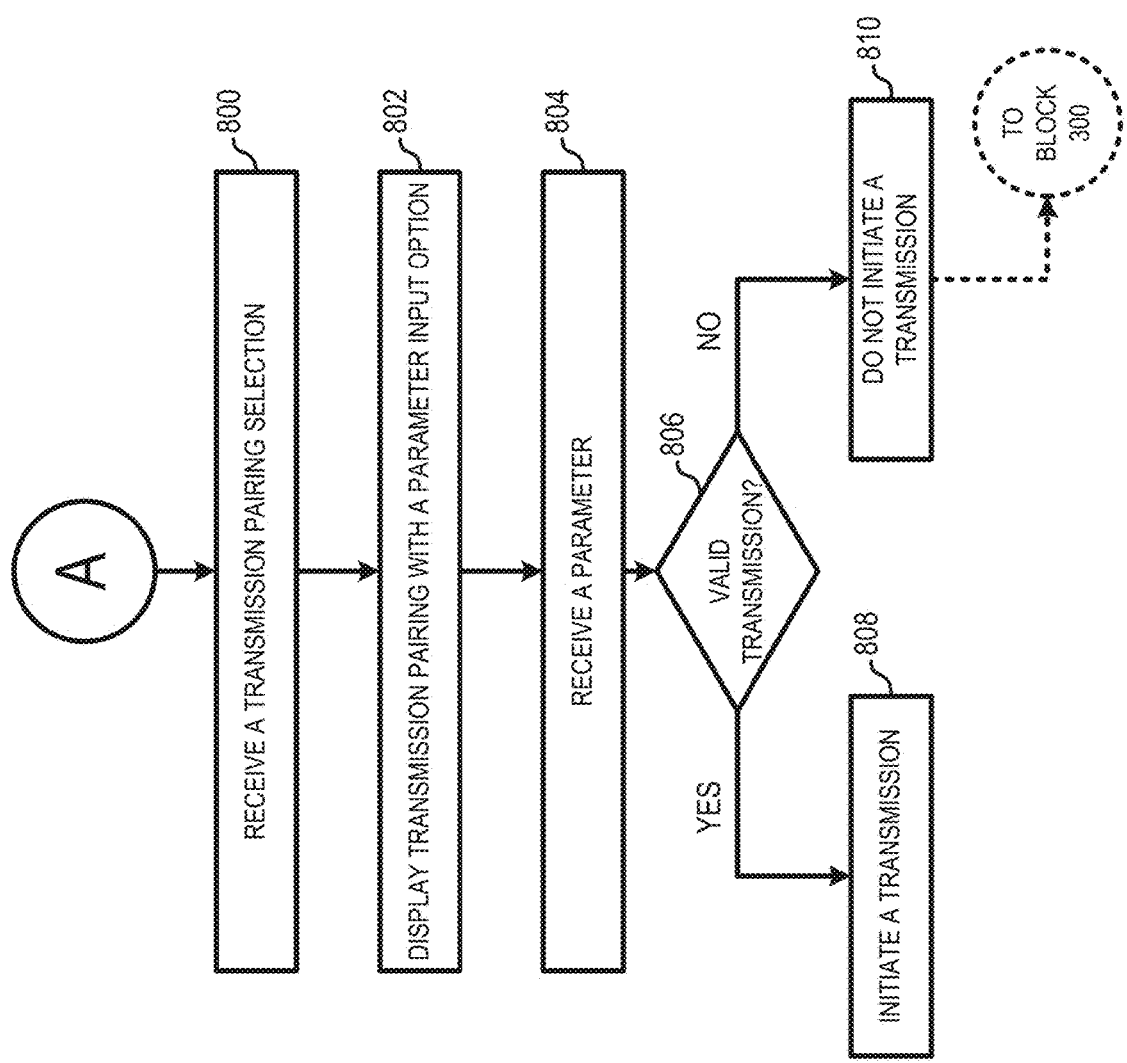
FIG. 8 is a flow chart of a process for implementing a transmission using a transmission pairing according to some aspects of the present disclosure.

FIG. 8 is a flow chart of a process for implementing a transmission using a transmission pairing according to some aspects of the present disclosure. The process is described with respect to the network environment 100 of FIG. 1 and the secure database 120 of FIGS. 1 and 2, although other implementations are possible without departing from the scope of the present disclosure.

In block 800, a selection of a transmission pairing is received. In some aspects, the selection is received by the transmission pairing system 102 as a signal transmitted from the user device 104 in response to a user selection. For example, the transmission pairing system 102 may generate a user interface including one or more transmission pairings, as described in block 316 of FIG. 3. The transmission pairings may each include a selection option corresponding to the transmission pairing that may be selected by the user to initiate the transmission process. In response to selecting the selection option, the signal may be transmitted to the transmission pairing system 102.

In block 802, the transmission pairing system 102 generates a user interface displaying the transmission pairing with an input option that may be selected by the user via the user device to input a parameter for the transmission. In some aspects, the parameter may include alphanumeric text and be entered into the input option using a keyboard of the user device 104.

In block 804, a parameter is received. The parameter may be received by the transmission pairing system 102 in response to a selection of the selection option and a response. The parameter may correspond to the secure information to be transmitted from the source identified in the transmission pairing to the destination identified in the transmission pairing. The parameter may further correspond to a value or other indication of how the secure information of the source should be modified to account for the transmission at least a portion of the secure information from the source to the destination.

In block 806, the transmission pairing system 102 determines if the transmission pairing would result in a valid transmission. The validation may take place in response to a user selecting a selection option to initiate the transmission. In some aspects, the validation process may include validating that that the transmission may be initiated at the selected time. For example, the transmission pairing system 102 may determine whether conditions regarding the transmission have not changed since the transmission pairing was created or stored by the system, such as, but not limited to whether accounts associated with the source and destination still exist). The validation process may also include validating that the conditions are appropriate to initiate the transmission at the time indicated. For example, in the case of the transmission of monetary information, the system may validate that the donor account includes sufficient funds to initiate a transfer based on the inputted parameter. As another example, the system may validate that a transmission may be initiated on the particular date (e.g., determining whether it is a national holiday or weekend). In additional aspects, the validation process may include determining whether the source is able to transmit secure information based on the parameter entered into the input option. For example, where the secure information relates to monetary information, the transmission pairing system 102 may determine whether the source has sufficient funds to allow for a transmission of the value identified as the parameter from the source to the destination (e.g., whether an account associated with the source has a sufficient balance).

In block 808, the transmission is initiated subsequent to a determination that the transmission is valid. In some aspects, the transmission pairing system 102 may initiate the transmission based on the parameter inputted by the user. For example, the transmission may include modifying the destination and source corresponding to the parameter. Returning to the example of transmitting monetary information, the secure account information corresponding to the source may be modified to subtract or withdraw a value or amount inputted as the parameter by the user. The secure account information corresponding to the destination may be modified to add or deposit an amount inputted as the parameter. The transmission may also be initiated based on the transmission type associated with the transmission. The transmission pairing system 102 may initiate a type-A transmission by causing the processor 110 to execute the Type-A instructions 116. The transmission pairing system 102 may initiate a Type-B transmission by causing the processor 110 to execute the Type-B instructions 118.

In block 810, the transmission may not be initiated subsequent to a determination that the transmission is invalid. In some aspects, the transmission pairing system 102 may generate a user interface including an error message or otherwise indicating that the transmission was unsuccessful. In some aspects, the transmission pairing system 102 may return the user to a process for regenerating a valid transmission pairing using the process of FIG. 3.

Illustrative Example of Initiating a Transmission Using a Transmission Pairing

Figure 9:
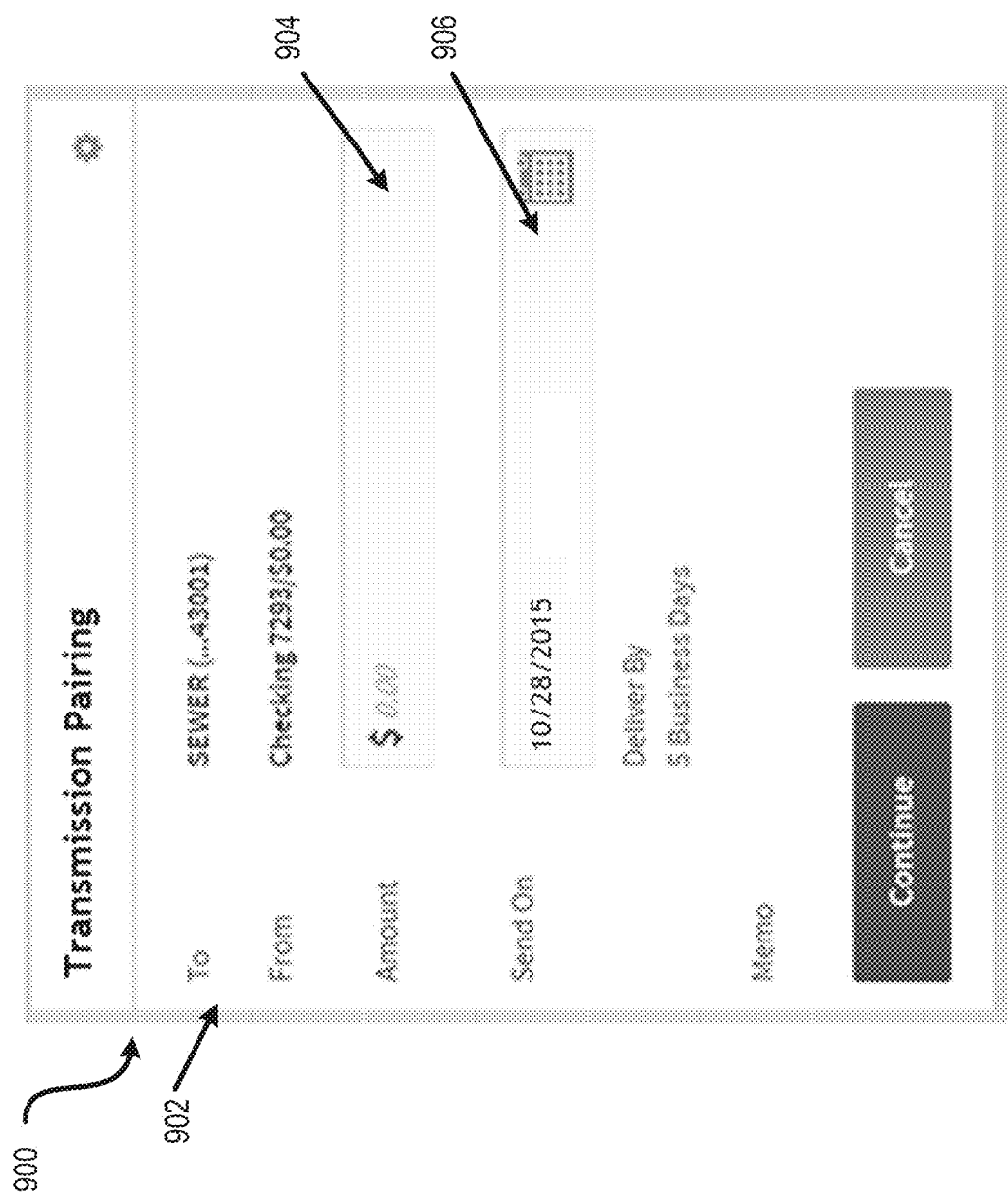
FIG. 9 is an example of a user interface for implementing a transmission using a transmission pairing according to some aspects of the present disclosure.

FIG. 9 is an example of a user interface 900 for implementing a transmission using a transmission pairing according to some aspects of the present disclosure. The user interface 900 may be generated in response to a selection of selection option corresponding to the transmission pairing. For example, the user interface 900 may be generated by the transmission pairing system 102 in response a user selecting the selection option 606 corresponding to the transmission pairing 504 of FIG. 6. The user interface 900 includes details regarding the transmission pairing, including the destination and the source stored in the secure database 120. The user interface 900 also includes an input option 904 that may be selected by the user via the user device 104 to input a parameter. In the present example, the parameter corresponds to an amount of money. The user may select the input option and enter a monetary amount using the keyboard of user device 104. The user interface 900 also includes a second input option 906 that allows the user to select a date or time for initiating the transmission. In some aspects, availability of the input option 906 may depend on the transmission type. For example, a payment-type transmission may include the input option 906, but a transfer-type transmission may not. The user may select the "Continue" selection option to submit the transmission for validation.

Figure 10:
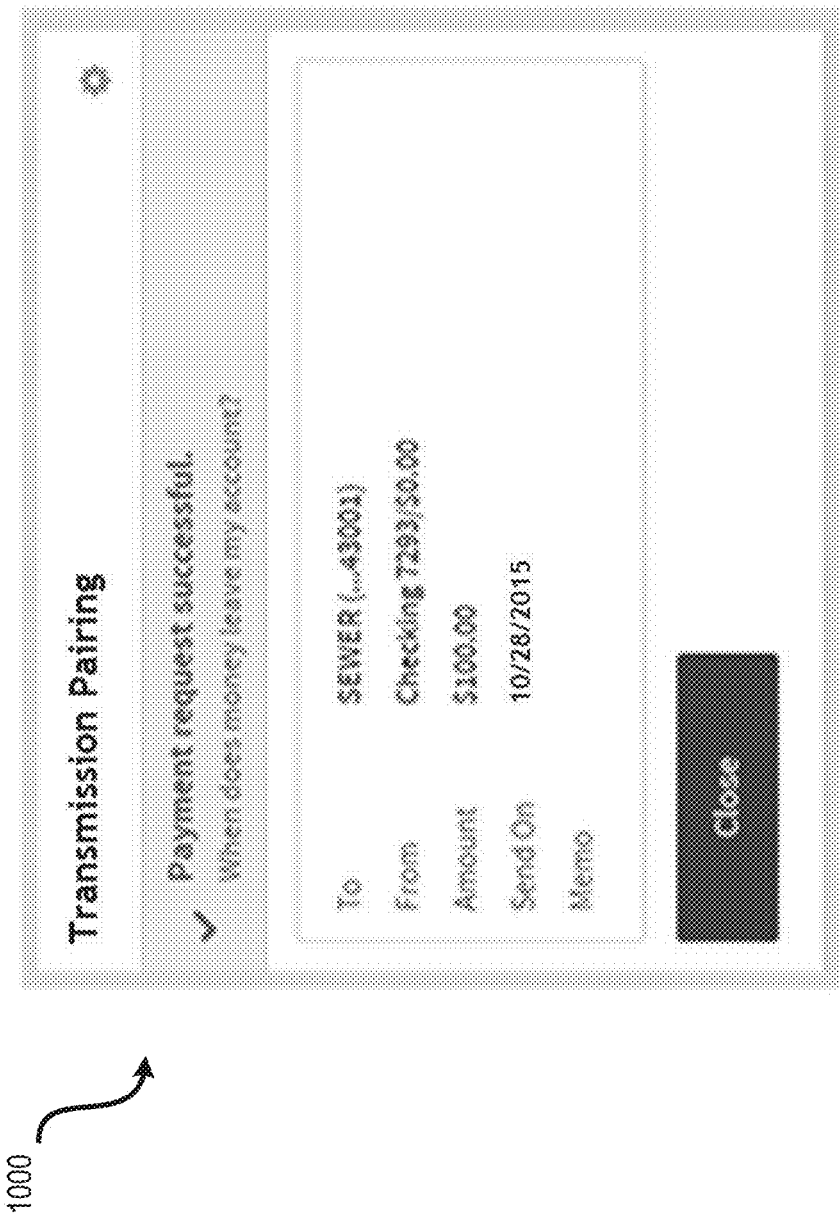
FIG. 10 is an example of a user interface confirming the transmission of FIG. 9 according to some aspects of the present disclosure.

FIG. 10 is an example of a user interface 1000 confirming the transmission of FIG. 9 according to some aspects of the present disclosure. The user interface 1000 may be generated in response to a determination by the transmission pairing system 102 that the transmission is valid. The user interface 1000 indicates that the parameter corresponded to a monetary value of $100. Secure information may be transmitted from the source (e.g., the checking account) to the destination (e.g., the sewer utility company) corresponding to the monetary value. For example, the secure information may include an electronic payment or an instruction causing the monetary value to be added to the account associated with the destination and subtracted from the account associated with the source.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. The illustrative examples described above are given to introduce the reader to the general subject matter discussed here and are not intended to limit the scope of the disclosed concepts.

What is claimed is:

1. A system, comprising:
a secure database including (1) a plurality of source identifiers corresponding to source financial accounts and (2) a plurality of destination identifiers corresponding to destination financial accounts, the plurality of source identifiers being linked with a user identifier in the secure database, the user identifier corresponding to a user of a user device;
a processor communicatively coupled to the secure database; and
a memory communicatively coupled to the processor and including instructions that are executable by the processor for causing the processor to:
generate a first user interface displayable on the user device communicatively coupled to the processor via a network, the first user interface including a list of available destination financial accounts corresponding to a set of destination identifiers of the plurality of destination identifiers;
receive, from the user device via the network, a first selection corresponding to a destination financial account from the list of available destination financial accounts;
in response to receiving the first selection:
determine a type or ownership characteristic of the selected destination financial account;
determine a transmission type from among a plurality of transmission types based on the type or ownership characteristic of the selected destination financial account;
determine a list of available source financial accounts based on the determined transmission type; and
generate a second user interface displayable on the user device, the second user interface including the list of available source financial accounts, the list of available source financial accounts corresponding to a set of source identifiers of the plurality of source identifiers;
receive, from the user device via the network, a second selection corresponding to a source financial account from the list of available source financial accounts;
based on receiving the second selection:
generate a transmission pairing including the source financial account and the destination financial account by linking in the secure database (i) a source identifier corresponding to the source financial account and (ii) a destination identifier corresponding to the destination financial account; and
link the transmission pairing with the user identifier in the secure database; and
subsequent to generating the transmission pairing:
obtain a plurality of stored transmission pairings corresponding to the user identifier from the secure database, the plurality of stored transmission pairings including the transmission pairing;
generate a third user interface displayable on the user device, the third user interface listing the plurality of stored transmission pairings and corresponding selection options that are selectable by the user, wherein the third user interface includes a selection option that corresponds to the transmission pairing and that is selectable by the user for transmitting a monetary amount using the transmission pairing;
detect a selection of the selection option;
based on detecting the selection of the selection option, transmit a request for the monetary amount to the user device;
receive the monetary amount from the user device; and
based on receiving the monetary amount, execute a transmission process in which the monetary amount is electronically transmitted from the source financial account to the destination financial account in accordance with the determined transmission type.

2. The system of claim 1, wherein the memory includes additional instructions that are executable by the processor for causing the processor to generate, in response to the selection of the selection option by the user device, a fourth user interface displayable on the user device, the fourth user interface including an input option selectable by the user to input, via the user device, the monetary amount.

3. The system of claim 1, wherein each of the corresponding selection options are selectable by the user to initiate a different transmission process.

4. The system of claim 1, wherein the memory includes additional instructions that are executable by the processor for causing the processor to validate at least one of the source financial account or the destination financial account prior to initiating the transmission process.

5. The system of claim 4, wherein the additional instructions are executable by the processor for causing the processor to validate the source financial account or the destination financial account by verifying that the source identifier corresponding to the source financial account or the destination identifier corresponding to the destination financial account is stored in the secure database.

6. The system of claim 4, wherein the additional instructions are executable by the processor for causing the processor to validate the source financial account by verifying that the source financial account has at least the monetary amount prior to initiating the transmission process.

7. The system of claim 1, wherein the secure database further includes:
the plurality of stored transmission pairings, each pairing of the plurality of stored transmission pairings including one source identifier of the plurality of source identifiers and one destination identifier of the plurality of destination identifiers; and
a plurality of instructive notes, each note of the plurality of instructive notes being linked with a corresponding transmission pairing of the plurality of stored transmission pairings,
wherein the memory includes additional instructions that are executable by the processor for causing the processor to generate, in response to the selection of the selection option by the user device, a fourth user interface displayable on the user device, the fourth user interface including an input option selectable by the user to input, via the user device, a note storable with the plurality of instructive notes in the secure database.

8. The system of claim 1, wherein the memory includes additional instructions executable by the processor for causing the processor to:
generate, in response to initiating a new transmission from a new source financial account to a new destination financial account, a fourth user interface displayable on the user device, the fourth user interface including a second selection option selectable by the user to generate, via the user device, a new transmission pairing including a new source identifier corresponding to the new source financial account linked with a new destination identifier corresponding to the new destination financial account, and to link the new transmission pairing with the user identifier in the secure database.

9. The system of claim 1, wherein each source financial account in the list of available source financial accounts is a different financial account held by the user.

10. A computer-implemented method, comprising:
receiving, from a user device, a first request to generate a transmission pairing;
in response to receiving the first request to generate the transmission pairing, transmitting a list of available destination financial accounts to the user device;
receiving, from the user device, a first selection corresponding to a destination financial account from the list of available destination financial accounts;
in response to receiving the first selection:
 determine a type or ownership characteristic of the selected destination financial account;
 determining a transmission type from among a plurality of transmission types based on the type or ownership characteristic of the destination financial account;
 determining a list of available source financial accounts based on the determined transmission type; and
 transmitting the list of available source financial accounts to the user device;
receiving, from the user device, a second selection corresponding to a source financial account from the list of available source financial accounts;
in response to receiving the second selection, generating the transmission pairing by:
 linking in a secure database (i) a source identifier corresponding to the source financial account and (ii) a destination identifier corresponding to the destination financial account; and
 linking the transmission pairing with a user identifier in the secure database, the user identifier corresponding to a user of the user device;
subsequent to generating the transmission pairing:
 obtaining a plurality of stored transmission pairings corresponding to the user identifier from the secure database, the plurality of stored transmission pairings including the transmission pairing;
 generating a third user interface displayable on the user device, the third user interface listing the plurality of stored transmission pairings and corresponding selection options that are selectable by the user, wherein the third user interface includes a selection option that corresponds to the transmission pairing and that is selectable by the user for transmitting a monetary amount using the transmission pairing;
 detecting a selection of the selection option;
 based on detecting the selection of the selection option, transmitting a second request for a monetary amount to the user device;
 receiving, from the user device, the monetary amount; and
 based on receiving the monetary amount, executing a transmission process in which the monetary amount is electronically transmitted from the source financial account to the destination financial account in accordance with the determined transmission type.

11. The method of claim 10, further including validating at least one of the source financial account or the destination financial account prior to initiating the transmission process.

12. The method of claim 11, wherein validating at least one of the source financial account or the destination financial account includes verifying that the source identifier or the destination identifier is stored in the secure database.

13. The method of claim 11, wherein validating at least one of the source financial account or the destination financial account includes verifying that the source financial account has at least the monetary amount prior to initiating the transmission process.

14. The method of claim 10, wherein the secure database includes:
 a plurality of transmission pairings, each pairing of the plurality of transmission pairings including one source identifier corresponding to one source financial account and one destination identifier corresponding to one destination financial account; and
 a plurality of instructive notes, each note of the plurality of instructive notes being associated with a corresponding transmission pairing of the plurality of transmission pairings.

15. The method of claim 10, further including:
initiating a first transmission between a first source financial account and a first destination financial account; and
displaying, subsequent to initiating the first transmission, a summary of the transmission, the summary including a second selection option selectable to generate a new transmission pairing including a first source identifier corresponding to the first source financial account linked with a first destination identifier corresponding to the first destination financial account, and to link the new transmission pairing with the user identifier in the secure database.

16. The method of claim 10, wherein each source financial account in the list of available source financial accounts is a different financial account held by the user.

17. A non-transitory computer-readable medium comprising program code that is executable by a processor for causing the processor to:
receive, from a user device, a first request to generate a transmission pairing;
in response to receiving the first request to generate the transmission pairing, transmit a list of available destination financial accounts for the transmission pairing to the user device;
receive, from the user device, a first selection of a destination financial account from the list of available destination financial accounts;
in response to receiving the first selection:
 determine a type or ownership characteristic of the destination financial account;
 determine a transmission type based on the type or ownership characteristic of the destination financial account;
 determine a list of available source financial accounts based on the determined transmission type; and
 transmit the list of available source financial accounts to the user device;
receive, from the user device, a second selection of a source financial account from the list of available source financial accounts;
in response to receiving the second selection, generate the transmission pairing by:

linking in a secure database (i) a source identifier corresponding to the source financial account and (ii) a destination identifier corresponding to the destination financial account; and linking the transmission pairing with a user identifier in the secure database, the user identifier corresponding to a user of the user device;

subsequent to generating the transmission pairing:

obtaining a plurality of stored transmission pairings corresponding to the user identifier from the secure database, the plurality of stored transmission pairings including the transmission pairing;

generating a third user interface displayable on the user device, the third user interface listing the plurality of stored transmission pairings and corresponding selection options that are selectable by the user, wherein the third user interface includes a selection option that corresponds to the transmission pairing and that is selectable by the user for transmitting a monetary amount using the transmission pairing;

detecting a selection of the selection option;

based on detecting the selection of the selection option, transmitting a second request for a monetary amount to the user device;

receiving, from the user device, the monetary amount; and based on receiving the monetary amount, initiate a transmission process in which a monetary amount is electronically transmitted from the source financial account to the destination financial account in accordance with the determined transmission type.

18. The non-transitory computer-readable medium of claim 17, further comprising program code that is executable by the processor for causing the processor to validate at least one of the source financial account or the destination financial account prior to initiating the transmission process.

19. The non-transitory computer-readable medium of claim 17, wherein each source financial account in the list of available source financial accounts is a different financial account held by a user of the user device.

20. The non-transitory computer-readable medium of claim 19, wherein at least one destination financial account in the list of available destination financial accounts is held by a user of the user device.

\* \* \* \* \*

UNITED STATES PATENT AND TRADEMARK OFFICE
CERTIFICATE OF CORRECTION

| | |
|---|---|
| PATENT NO. | : 11,308,463 B2 |
| APPLICATION NO. | : 15/154230 |
| DATED | : April 19, 2022 |
| INVENTOR(S) | : Daniel Mauney, Ronald Lee Ratcliffe, Jr. and Matthew Whitley |

It is certified that error appears in the above-identified patent and that said Letters Patent is hereby corrected as shown below:

On the Title Page

At item (72) Inventors:

Delete "Dan Mauney" and insert -- Daniel Mauney --

Delete "Lee Ratcliffe, Jr." and insert -- Ronald Lee Ratcliffe, Jr. --

Signed and Sealed this
Ninth Day of December, 2025

John A. Squires
*Director of the United States Patent and Trademark Office*